United States Patent
Sane

(10) Patent No.: US 8,989,743 B2
(45) Date of Patent: Mar. 24, 2015

(54) BATTERY CONSERVATION IN STATIONARY CONDITIONS FOR A WIRELESS DEVICE

(75) Inventor: Sachin J. Sane, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 13/596,441

(22) Filed: Aug. 28, 2012

(65) Prior Publication Data

US 2014/0065974 A1 Mar. 6, 2014

(51) Int. Cl.
*H04W 36/00* (2009.01)
*H04B 1/38* (2006.01)
*H04W 52/02* (2009.01)

(52) U.S. Cl.
CPC ...... *H04W 52/0254* (2013.01); *H04W 36/0088* (2013.01)
USPC .......................................... 455/436; 455/574

(58) Field of Classification Search
USPC ...................... 455/436, 437, 441, 574, 343.1; 370/311, 331, 332
See application file for complete search history.

(56) References Cited

U.S. PATENT DOCUMENTS

| | | | |
|---|---|---|---|
| 6,067,460 A | 5/2000 | Alanara et al. | |
| 7,035,676 B2 | 4/2006 | Ranta | |
| 7,460,869 B2 * | 12/2008 | Pekonen et al. | 455/436 |
| 7,599,698 B2 | 10/2009 | Cheng et al. | |
| 8,190,153 B2 | 5/2012 | Zhao | |
| 8,254,858 B2 * | 8/2012 | Tu et al. | 455/574 |
| 8,284,731 B2 | 10/2012 | Shitara et al. | |
| 8,457,235 B2 | 6/2013 | Ko et al. | |
| 8,620,229 B2 * | 12/2013 | Snider | 455/557 |
| 8,675,535 B2 * | 3/2014 | Finlow-Bates et al. | 370/311 |
| 2002/0160798 A1 | 10/2002 | Shoji et al. | |
| 2006/0165188 A1 | 7/2006 | Wunder et al. | |
| 2007/0115796 A1 | 5/2007 | Jeong et al. | |
| 2008/0043677 A1 | 2/2008 | Kim | |
| 2008/0045228 A1 | 2/2008 | Zhang | |
| 2009/0020778 A1 | 1/2009 | Lee et al. | |
| 2009/0026285 A1 | 1/2009 | Lee et al. | |
| 2009/0164813 A1 | 6/2009 | Tu et al. | |

(Continued)

FOREIGN PATENT DOCUMENTS

| | | |
|---|---|---|
| EP | 0812119 | 10/1997 |
| JP | 2007-189349 | 7/2007 |

OTHER PUBLICATIONS

International Search Report and Written Opinion from PCT/US2013/056582, dated Nov. 25, 2013, Apple Inc., pp. 1-9.

(Continued)

*Primary Examiner* — Quochien B Vuong
(74) *Attorney, Agent, or Firm* — Meyertons, Hood, Kivlin, Kowert & Goetzel, P.C.

(57) ABSTRACT

Conserving battery by a wireless user equipment (UE) device in substantially stationary conditions. A first wireless link may be established with a first cell. It may be determined that the UE device is substantially stationary. One or more signal strength and/or signal quality metrics associated with the first wireless link may be measured. The one or more signal strength and/or signal quality metrics may be below a first threshold. The UE may ordinarily be configured to perform a search for neighboring cells if the one or more signal strength and/or signal quality metrics are below the first threshold. The UE may not actually perform a search for neighboring cells, based on determining that the UE is substantially stationary.

24 Claims, 3 Drawing Sheets

(56) References Cited

U.S. PATENT DOCUMENTS

2010/0304761 A1 12/2010 Seibert et al.
2011/0136530 A1 6/2011 Deshpande
2011/0151866 A1 6/2011 Zhao

OTHER PUBLICATIONS

U.S. Appl. No. 12/993,330, filed Nov. 18, 2010, Sairamesh Nammi.
Office Action from Japanese Patent Application No. 2011-516653, mailed Sep. 25, 2013, English Translation), pp. 1-4.
First Office Action, Search Report, and translation thereof, in Chinese Patent Application No. 200980124006.7, Feb. 18, 2013, pp. 1-11.
Korean Intellectual Property Office, International Search Report for PCT/US2009/048629 dated Feb. 1, 2010 (4 pages).
Sivanesan et al., U.S. Appl. No. 12/919,840 entitled "Communicating a Feedback Data Structure Containing Information Identifying Coding to Be Applied on Wirelessly Communicated Signaling" filed Aug. 27, 2010 (28 pages).
Office Action and translation thereof in Japanese Patent Application No. 2011-516653, Feb. 14, 2013, pp. 1-6.
Nortel, 3GPP TSG-RAN WG1#53bis R1-08xxx, Warsaw, Poland, Jun. 30-Jul. 4, 2008, Agenda Item: 6.3, CQI/PMI reporting on PUSCH, Discussion and Decision (6 pages).
Rohde & Schwarz, UMTS Long Term Evolution (L TE) Technology Introduction, Application Note 1 MA111, Mar. 2007 (32 pages).
3rd Generation Partnership Project;Technical Specification Group Radio Access Network; Evolved Universal Terrestrial Radio Access (E-UTRA); Physical layer procedures (Release 8) {77 pages).

\* cited by examiner

BATTERY CONSERVATION IN STATIONARY CONDITIONS FOR A WIRELESS DEVICE

FIELD OF THE INVENTION

The present application relates to wireless devices, and more particularly to a system and method for a wireless device to conserve battery in stationary conditions.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones.

For example, if a cellular phone is experiencing degraded signal strength or quality, a common cause is movement of the cell phone (e.g., a user of the cell phone may be carrying the cell phone while moving) which results in lower signal strength or quality from the serving cell as the user moves away from the serving cell's base station. As a result, some wireless communication technologies require that a wireless device search for alternative cells upon detecting degraded signal strength or quality. If the wireless device is moving, and the movement is the cause of the degraded signal strength or quality, such a search may result in the wireless device attaching to a different serving cell with better signal strength and/or quality, and may thus be justified.

However, while it is desirable for users to be able to use their wireless devices in a mobile manner, it is also common for users to spend significant amounts of time in substantially stationary conditions. For example, a user may often spend multiple continuous hours at their home, during which they may not travel more than a few hundred feet. Similarly, a user might often spend multiple continuous hours at work (e.g., in an office) in similarly substantially stationary conditions.

In such substantially stationary conditions, it is still possible for signal strength or quality to undergo some fluctuation. For example, signal strength or quality may in some cases be affected by the orientation of a wireless device, by obstacles to line-of-sight, and/or other factors. Since the wireless device is substantially stationary, it is highly unlikely that searching for neighboring cells will yield a better option than the existing serving cell. However, in many wireless technologies the wireless device may still be required to search for neighboring cells in response to degraded signal strength/quality. These searches tend to be a relatively intensive use of power, and in such cases in which they are not of much use, they may be wasteful of the wireless device's battery. Accordingly, improvements in wireless communications would be desirable.

SUMMARY OF THE INVENTION

In light of the foregoing and other concerns, it would be desirable to provide a way for wireless devices to conserve battery in stationary conditions. In particular, it may be desirable to provide a way for a wireless device to determine when it is not undergoing significant movement, and thus when some or all of the policies and procedures which are primarily useful under mobile conditions may be unnecessary. In this way, the wireless device may avoid undertaking power-intensive procedures which would not actually improve user experience. This may, in turn, result in considerable energy savings, which may significantly improve user experience, by providing a longer battery life.

As noted above, an example of a policy which may be useful under mobile conditions but not under stationary conditions is a requirement to search for neighboring cells if signal strength of a serving cell drops below a certain threshold. Under mobile conditions, decreasing signal strength may commonly be a result of the wireless device moving out of range of the serving cell, in which case it is likely that a neighboring cell (e.g., towards which the wireless device may be moving) may provide better signal strength and signal quality.

Such a policy may serve little purpose, however, under stationary conditions; in most such situations, it is unlikely that a different cell will provide better signal strength than the current serving cell, even if signal strength of the serving cell is relatively low.

As such, some embodiments of the present disclosure are directed to modifying a wireless device's search policy. For example, if the wireless device is able to determine that it is experiencing substantially stationary conditions, the wireless device may reduce the frequency with which it searches for neighboring cells if signal strength of the serving cell drops below a certain threshold. The wireless device may even avoid performing such searches altogether under stationary conditions, although this may not always be desirable, for example in case of certain exceptional situations in which a search might improve device performance even in stationary conditions, and/or in case the wireless device misjudges whether or not it is substantially stationary.

More particularly, some embodiments relate to a wireless device which implements a discontinuous reception (DRX) mode. For example, a wireless device implementing a DRX mode might typically perform certain actions during DRX cycles, which may occur at periodic intervals, and remain inactive (e.g., to save battery) in the portions of the cycles between the periodic scheduled actions. Measurement of signal strength of the serving cell might be one such action, which according to some embodiments may be taken every DRX cycle.

Certain DRX parameters may typically be provided to the wireless device by the wireless service provider's network. For example, the network might provide a 'search threshold' parameter, based on which the wireless device might be expected to perform a search for neighboring cells if the signal strength is below the search threshold in a given DRX cycle.

However, if the wireless device knows that it is substantially stationary, the wireless device may reduce the frequency with which it performs searches in response to signal strength being below the search threshold. For example, instead of performing a search in every DRX cycle in which signal strength is below the search threshold, if the wireless device is stationary, a search might be performed once every two (or three, four, or any number) DRX cycles in which signal strength is below the search threshold. Thus, the wireless device may conserve energy (and thus battery) by reducing the frequency with which searches for neighboring cells are performed in situations in which such searches are relatively unlikely to improve device performance.

It should be noted that while a wireless device's policy for performing searches for neighboring cells in response to low signal strength may be one example of a policy which may advantageously be modified to conserve battery under stationary conditions, other policies and procedures may similarly be modified to conserve battery under stationary conditions according to various embodiments of the present disclosure, as will be recognized by those of skill in the art in light of the present disclosure.

Accordingly, embodiments are presented herein of a method for a wireless user equipment (UE) device to conserve battery in stationary conditions and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present invention can be obtained when the following detailed description of the embodiments is considered in conjunction with the following drawings.

Figure 1:
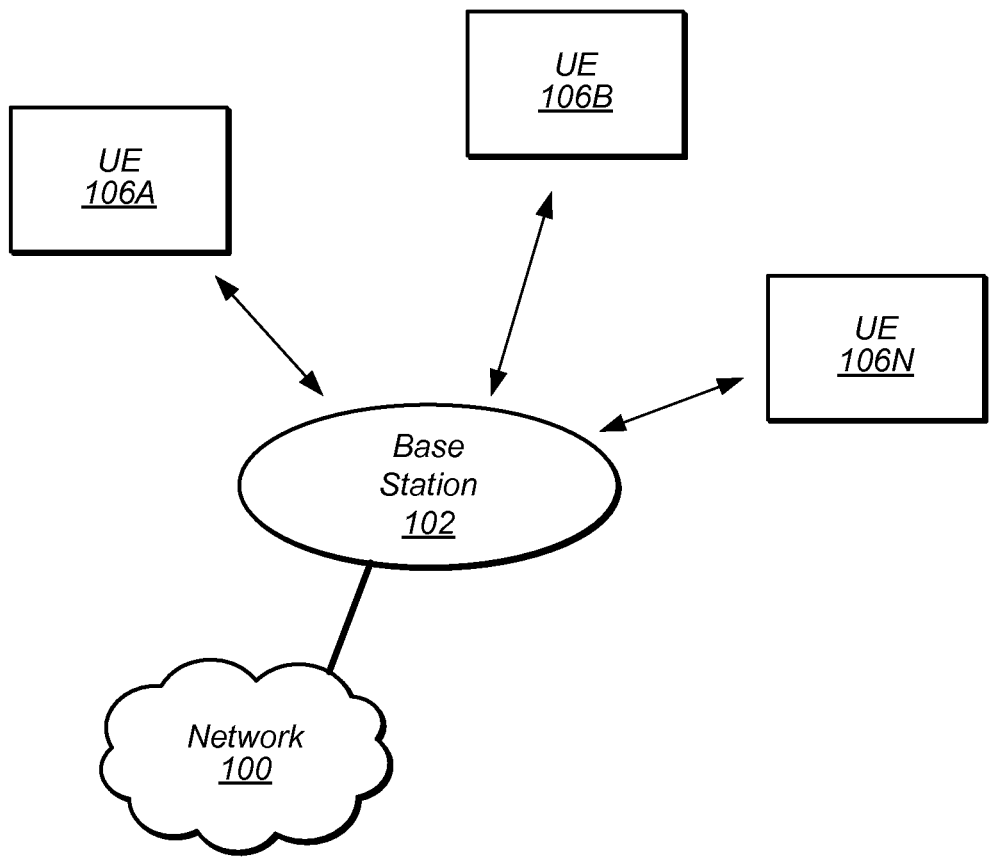
FIG. 1 illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
  UE: User Equipment
  BS: Base Station
  GSM: Global System for Mobile Communication
  UMTS: Universal Mobile Telecommunication System
  LTE: Long Term Evolution
Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIGS. 1 and 1—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

In some embodiments, UE 106 may be capable of communicating using multiple wireless communication standards. For example, the UE 106 might be configured to communicate using two or more of GSM, UMTS, CDMA200, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Figure 2:
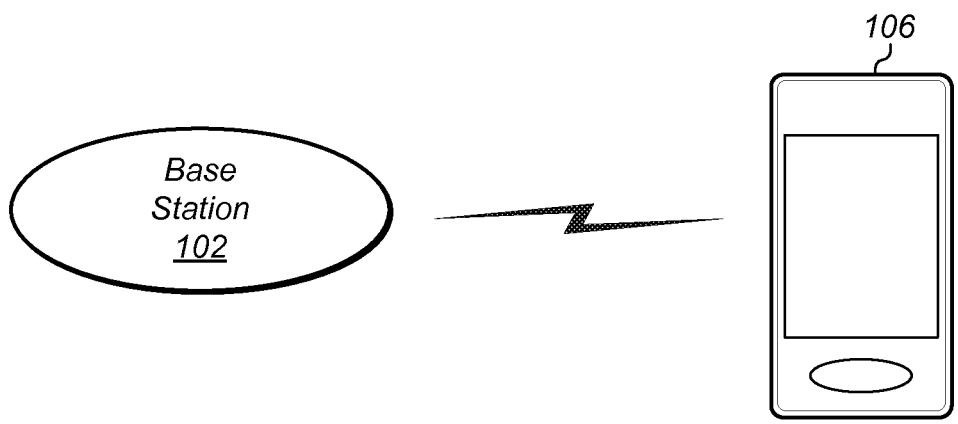
FIG. 2 illustrates a base station in communication with user equipment.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple wireless communication protocols. For example, the UE 106 may be configured to communicate using two or more of UMTS, CDMA 2000, LTE, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1×RTT, and separate radios for communicating using each of Wi-Fi and Bluetooth. Other configurations are also possible.

In some embodiments, the UE 106 may also be configured to determine when it is in substantially stationary conditions. The UE 106 may in turn utilize this information to avoid performing procedures which, as a result of being in substantially stationary conditions, are unlikely to yield any significant benefit. For example, in one set of embodiments, the UE 106 may be configured to modify its intra- or inter-frequency cell search behavior in response to degraded signal strength and/or quality if it is determined that the UE 106 is in substantially stationary conditions, such as further described hereinbelow.

Figure 3:
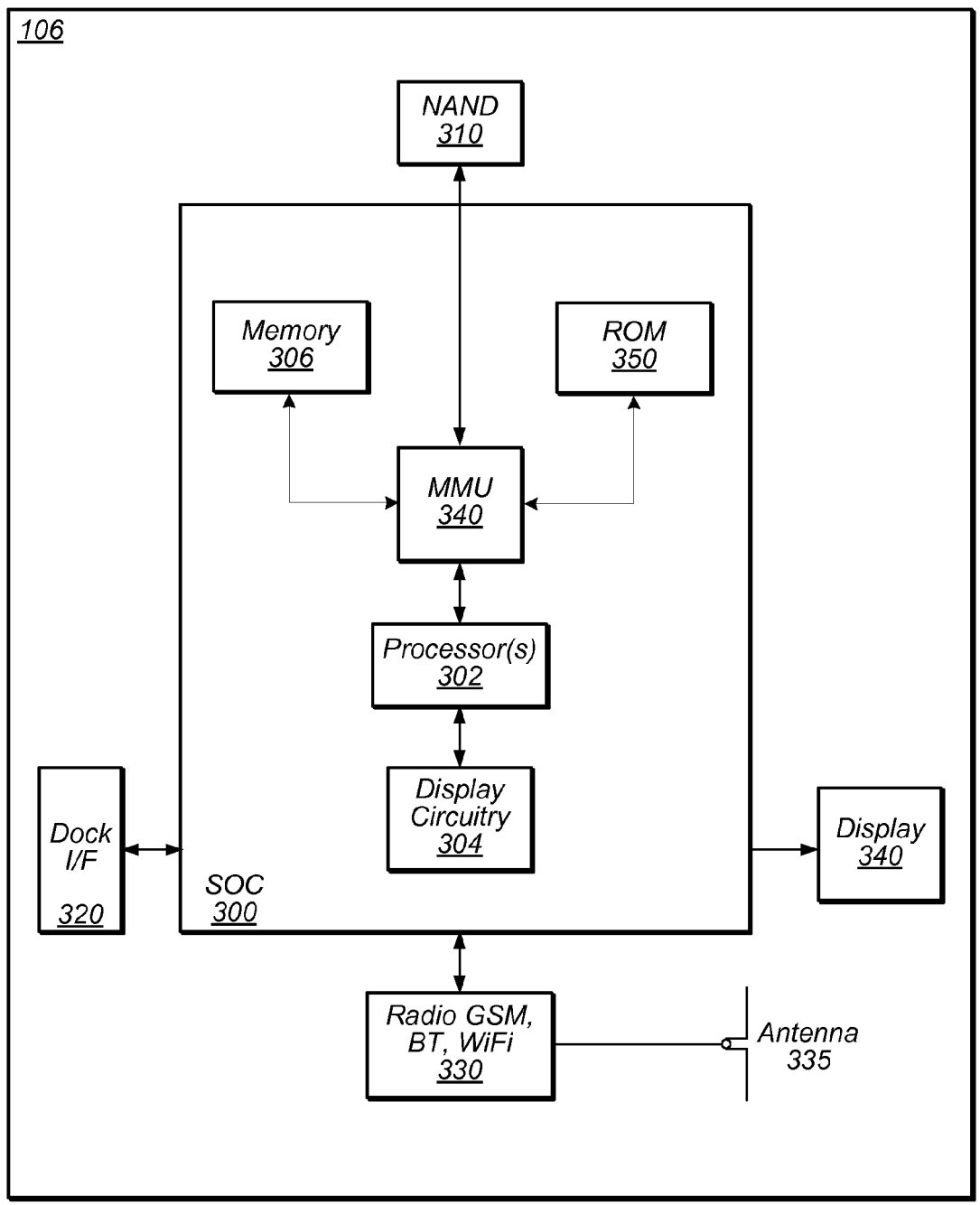
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for UMTS, LTE, CDMA2000, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

Figure 4:
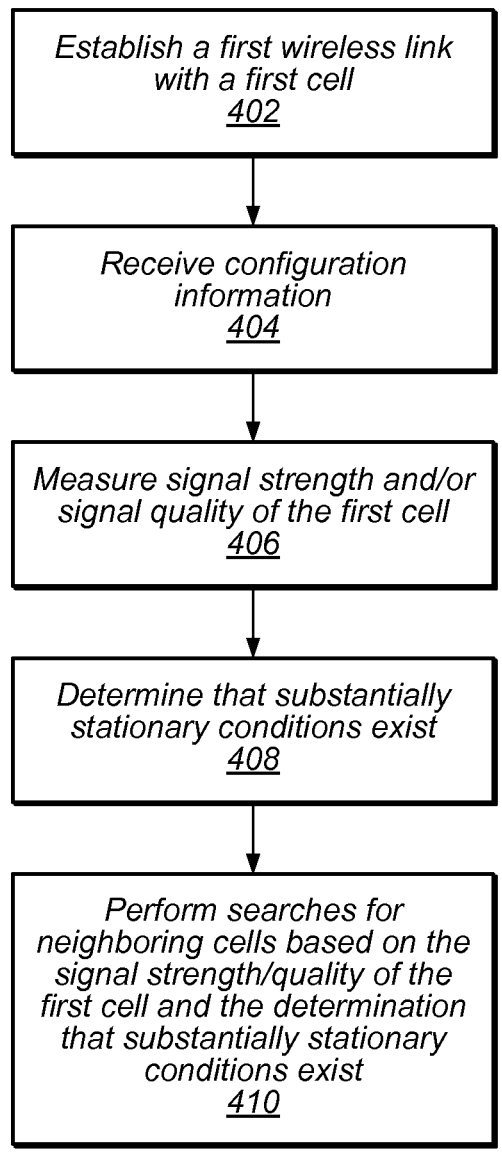
FIG. 4 is a flowchart diagram illustrating a method for a UE to conserve battery in stationary conditions according to one embodiment.

As described herein, the UE 106 may include hardware and software components for implementing a method for conserving battery in stationary conditions according to embodiments of this disclosure. FIG. 4 and the description provided with respect thereto relate to one such method according to one set of embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIGS. 4—Flowchart

FIG. 4 is a flowchart diagram illustrating a method for a UE device 106 to conserve battery in substantially stationary conditions. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a first wireless link may be established with a first cell. The first wireless link may operate according to any of various wireless technologies. In some embodiments, the first wireless link may be a cellular link according to a cellular technology such as GSM, UMTS, LTE, CDMA2000 (1×RTT, 1×EV-DO), etc. The cell may accordingly be provided by a base station 102 and may provide a connection to a core network, e.g., of a cellular service provider. The base station 102 may operate in conjunction with numerous other base stations (which may provide other cells) and other network hardware and software to provide continuous (or nearly continuous) overlapping wireless service over a wide geographic area.

The first cell may serve the UE 106 and provide a connection to the core network via the first wireless link, and as such may act as the "serving" cell for the UE 106. There may also be one or more "neighboring" cells, provided by nearby base stations, with which the UE 106 may be capable of discovering, detecting signals from, and possibly communicating, but with which the UE 106 may not have an active wireless link.

In 404, configuration information may be received. As part of the process of attaching to the network (e.g., via the first cell, or previously via another cell), the UE 106 may receive configuration information indicating various policies and procedures implemented by the network operator (e.g., the cellular service provider), according to which the UE 106 may be expected to operate.

For example, when a UE 106 is not actively exchanging data (e.g., as part of a call or a networking application such as a web browser) with the network, the UE may typically operate in an idle mode, which may sometimes be a "discontinuous reception" or "DRX" mode. In a DRX mode, a UE 106 may generally be inactive (e.g., with one or more components, such as radio and/or baseband components, powered down or sleeping) except for a window of activity during each DRX cycle. The active portion of a DRX cycle may be scheduled in a regular periodic manner; for example, many networks schedule the active portion of DRX cycles to occur at 1.28 s intervals, or at some multiple of 1.28 s (e.g., 2.56 s, 5.12 s, etc). Other values for DRX periodicity may be used as desired.

During the active portion of a DRX cycle, the UE 106 may perform certain actions according to the configuration of the UE 106 and/or according to the configuration information received from the network. For example, the UE 106 may monitor a paging channel for incoming voice calls or data during the active portion of the DRX cycle. Accordingly, information indicating the length and/or other characteristics of the DRX cycle may be provided by the network to the UE 106 as part of the configuration information, in order to facilitate coordinated operation between the UE 106 and the network.

In addition, the UE 106 may perform one or more measurements during the active portion of the DRX cycle. For example, the UE 106 may measure one or more signal strength and/or signal quality metrics of the serving cell. The configuration information may indicate a "search threshold" value for such measurements. If the signal strength and/or signal quality metrics are less than the search threshold (also referred to herein as a "first threshold" in a given DRX cycle, the UE 106 may be expected to perform a search for neighboring cells. Such a search may be justified if, as is common, the signal strength/quality have decreased as a result of movement away from the serving cell and towards one or more other cells, in which case the search may discover one or more neighboring cells with stronger signal strength and/or signal quality. Based on this, the UE 106 can determine if a handover to another cell (e.g., a neighboring cell discovered in such a search) would be appropriate.

Thus, in some embodiments, the configuration information may configure the UE 106, or be used by the UE 106 to configure the UE 106, to operate in a DRX mode. As noted above, the DRX mode may be an "idle" DRX; however, in some embodiments the UE may also or alternatively be configured to operate in a "connected" DRX, in which the UE 106 actually receives and/or transmits data (e.g., voice and/or content data) during the active part of the DRX cycle; the configuration information may thus also or alternatively include information for configuring the UE 106 to operate in a connected DRX mode. In other embodiments, the configuration information may also or alternatively be used to configure the UE 106 in various ways (e.g., for measuring signal strength and/or quality and performing searches for neighboring cells) in a manner that is not necessarily related to a DRX mode.

In 406, signal strength and/or signal quality of the first cell may be measured. Any of various metrics may be used for measuring signal strength and/or signal quality, as desired. For example, in code division multiple access (CDMA) systems such as WCDMA and CDMA2000, the metric Ec/Io may commonly be measured. In LTE, signal strength and signal quality metrics may include reference signal received power (RSRP) and reference signal received quality (RSRQ) respectively. Any of these metrics or other signal strength and/or signal quality metrics may be measured according to various embodiments, e.g., as appropriate for the wireless technology with respect to which the method is implemented.

As noted above, in some embodiments, the signal strength and/or signal quality of the first cell may be measured in accordance with a DRX mode of operation of the UE 106. In this case, multiple signal strength and/or signal quality measurements may be made; for example, during each DRX cycle, the signal strength and/or quality of the first cell may be measured. The DRX mode may be an idle DRX mode or a connected DRX mode according to various embodiments. Alternatively, or in addition, the signal strength and/or signal quality measurement(s) may be made in other operating modes of the UE 106, such as a connected mode (e.g., during continuous active communication with the network), if desired.

In 408, it may be determined that substantially stationary conditions exist. "Substantially stationary" conditions may be conditions in which the UE 106 is not moving a significant distance relative to the size of nearby cells providing wireless service. For example, a user sitting at a desk or walking around within a ~50-100 ft radius in a home or office setting may experience substantially stationary conditions in region in which cells each provide service over a 1-5 mile radius. The exact amount of movement that may be accommodated within substantially stationary conditions may vary depending on sizes of cell service ranges and overlaps, which may in turn depend on the cellular network operator, current network conditions, and the nature of the wireless technology in question. However, in many embodiments, substantially stationary conditions may typically exist if movement is limited to within a room (e.g., an office, a bedroom, etc.); in some embodiments, substantially stationary conditions may also sometimes exist if movement is limited to within a building (e.g., an office building, a house, an apartment complex, etc.).

Determining that substantially stationary conditions exist may be performed in any of a variety of ways. For example, according to one set of embodiments, if one or more conditions indicative of substantially stationary conditions are valid, the UE 106 may determine based thereon that the UE 106 is experiencing substantially stationary conditions.

One type of condition might be based on previous signal strength and/or signal quality measurements. For example, if the signal strength/quality of the first cell has been consistently above a certain threshold for a certain amount of time or a certain number of measurements, this may be an indication that the UE 106 is experiencing substantially stationary conditions. Thus, in some embodiments, a condition might include a signal strength or quality metric being above a certain threshold (also referred to herein as a "second threshold") for a predetermined number of consecutive measurements. The second threshold and the predetermined number might each be any of a variety of numbers, depending on the level of confidence desired. As one example, in a UMTS system in which Ec/Io is measured, the second threshold might be −13 dB. Other second threshold values (e.g., −12 dB, −11 dB, etc.) could be used as desired. Similarly, the predetermined number might be 25, 50, 80, 100, or any other number, as desired.

Variations of and alternatives to this condition which relate to previous signal strength and/or signal quality measurements are also possible. For example, in some embodiments, the signal strength or quality metric being above a certain threshold for a predetermined number of non-consecutive measurements out of a slightly greater number of consecutive measurements (e.g., 49 out of a previous consecutive 50 measurements, 78 out of 80, etc.) may be used as a condition, if desired. Other variations are also possible.

Another type of condition might be based on an association with a different type of wireless network. For example, while according to some embodiments the UE 106 may form the first wireless link according to a cellular communication protocol such as UMTS, LTE, CDMA2000, etc., which may provide service in a relatively large geographical area, the UE 106 may also be configured to form associations with a substantially localized type of wireless network. For example, the UE 106 may be configured to communicate according to one or more of various versions (e.g., a, b, g, n, ac, etc.) of IEEE 802.11 (Wi-Fi) with wireless local area networks (WLANs). Wi-Fi networks may typically be relatively localized networks, for example for providing a home network, a wireless hotspot in a café, a business network in an office building or suite within an office building, etc. As such, if the UE 106 associates with a Wi-Fi network, this may be a good indicator that the UE 106 is experiencing substantially stationary conditions.

Accordingly, in some embodiments, one condition that may be used to determine that the UE 106 is substantially stationary may relate to association with a Wi-Fi network. According to some embodiments, a condition might simply include the UE 106 successfully associating with a Wi-Fi network. In other embodiments, the condition may include measuring a signal strength (and/or signal quality) of an associated Wi-Fi network and determining that it is higher than a certain threshold (a "Wi-Fi signal strength threshold" or a "third threshold") on an instantaneous basis, or that it has been higher than the third threshold for a certain number of previous measurements consecutively or on average.

In some embodiments, it may also or alternatively be required as part of the condition that the Wi-Fi network be a "preferred" network, e.g., as indicated to the UE 106 by user input from a user, or as detected by the UE 106 based on frequent use of the Wi-Fi network. For example, the user might indicate (or the UE 106 might detect, e.g., based on use patterns) that a home Wi-Fi network and a work Wi-Fi network are preferred networks, while a Wi-Fi network at a public library or a coffee shop (e.g., in which the user may not spend a significant amount of time before moving to a new location) may not be a preferred network.

Other ways of determining that substantially stationary conditions exist are also possible. For example, in some embodiments, a user may provide user input (e.g., in response to a prompt, or in an unprompted manner) indicating to the UE 106 to enter a "stationary mode". This might be desirable if the user knows that they will be in the same location for a significant period of time and wants to improve battery life by taking advantage of battery-saving features such as described herein which are advantageous in substantially stationary conditions.

In other embodiments, a global navigational satellite system (GNSS), such as the global positioning system (GPS), operating as part of the UE 106 may be used to track or monitor the location and/or movement of the UE 106 and thus to determine whether the UE 106 is substantially stationary. However, it should be noted that in some embodiments, GNSS systems may require significant power use to operate, which may offset or even overcome any battery-saving advantage that may be gained according to the method described herein.

In some embodiments, determining that the UE 106 is substantially stationary may include detecting that at least one wired connection to the UE 106 exists, if desired. For example, if the UE 106 is connected to a wall outlet to charge the battery of the UE 106, it is highly likely that the UE 106 is experiencing substantially stationary conditions. However, this may also be a less than ideal method of determining that the UE 106 is substantially stationary for the purposes of the method in some embodiments, since if the UE 106 is connected to a power supply, battery conservation may no longer be as significant of a concern relative to device performance. Furthermore, wired connections are not necessarily indicative of stationary conditions, as in many cases a wired connection may be provided to another mobile device (e.g., speaker/microphone connection to headphones or a headset, power supply from an automobile or train, etc.). Nonetheless, any of the above-described and other techniques for determining that a UE 106 is stationary may be used, individually or in combination, if desired.

In 410, searches for neighboring cells may be performed based on the signal strength and/or quality of the first cell and the determination that substantially stationary conditions exist. As previously noted, if signal strength and/or signal quality of the first cell are less than ideal, this may be a trigger for initiating a search for neighboring cells. Such a search may be an intra-frequency search (e.g., searching for neighboring cells which operate in the same frequency band as the serving cell), or an inter-frequency search (e.g., searching for neighboring cells which operate in different frequency bands than the serving cell), or both, according to various embodiments. According to some embodiments, different thresholds may be used to trigger intra- and inter-frequency searches respectively; in other embodiments, the same threshold may be used to trigger both intra- and inter-frequency searches. As one example, in an exemplary UMTS system, Ec/Io may be measured, and if the measured Ec/Io is below −8 dB, both an intra-frequency search and an inter-frequency search may be triggered. Other thresholds (e.g., −9 dB, −7 dB, etc) may be used as desired, e.g., depending on the metric, wireless technology, and network operator.

Note that the first threshold may have a higher value than the second threshold, in some embodiments. In other words, it is possible that the UE 106 may measure signal strength/quality as being higher than the second threshold but lower than the first threshold. Under mobile conditions, determining that signal strength/quality is less than the first threshold may trigger a search for neighboring cells. However, if the signal strength/quality is above the second threshold, and has been for a sufficient number of measurements that the UE 106 has determined that it is in substantially stationary conditions (or the UE 106 has otherwise determined that it is in substantially stationary conditions), the triggering behavior may be modified such that determining that signal strength/quality is less than the first threshold does not always trigger a search for neighboring cells.

For example, in one set of embodiments, the UE 106 may be operating according to a DRX mode, such as described above. In this case, signal strength and/or quality measurements of the first cell may be performed in every DRX cycle. If the UE 106 is in mobile conditions, any time the signal strength and/or quality is determined to be below the first threshold, a search may be performed. However, if the UE 106 is in substantially stationary conditions, the UE 106 may not perform a search every time the signal strength and/or quality is determined to be below the first threshold. In other words, in some embodiments, fewer searches for neighboring cells may be performed than the number of times that the signal strength/quality metric is determined to be below the first threshold, in response to determining that the UE 106 is substantially stationary. For example, the frequency with which searches are performed in response to signal strength and/or quality being below the first threshold might be reduced, such that searches are performed once every other time, every third time, every fourth time, etc., that the signal strength and/or quality is measured as being below the first threshold.

In particular, according to one set of embodiments, the frequency with which searches are performed in response to signal strength and/or quality being below the first threshold may be reduced according to an exponential drop-off schedule. For example, according to one set of embodiments, if the UE 106 remains in stationary conditions but repeatedly measures signal strength and/or quality of the first cell as being below the first threshold, the UE 106 may initially perform a search in every second DRX cycle in which signal strength and/or quality of the first cell is below the first threshold, then every fourth such DRX cycle, then every eighth such DRX cycle, then every sixteenth such DRX cycle, and so on until searches performed extremely infrequently, even if signal strength and/or quality of the first cell is below the first threshold in every DRX cycle.

Note that while the above-described behavior modification is described in relation to use in a DRX mode, modifying search-related behavior in light of stationary conditions may also be performed in other modes of operation.

Other options for modifying search-related behavior in light of stationary conditions are also possible. For example, in one set of embodiments, in response to determining that the UE 106 is substantially stationary, the value of the first threshold may be modified (e.g., lowered). If a lower value is used as the first threshold in stationary conditions than in mobile conditions, this may in some embodiments similarly result in searches for neighboring cells occurring less frequently in stationary conditions than in mobile conditions. Accordingly, the UE 106 may conserve battery in stationary conditions by avoiding or reducing the frequency with which searches for neighboring cells are performed without significantly affecting device performance, since searching for neighboring cells may be unlikely to yield a better cell option if the UE 106 is substantially stationary.

At some point, the UE 106 may no longer be substantially stationary. For example, at the end of a work day, a user of the UE 106 may leave their office and drive home. According to some embodiments, the UE 106 may further be configured to detect that the UE 106 is no longer substantially stationary in such situations. For example, if the UE 106 based its determination that the UE 106 was in substantially stationary conditions on determining that one or more conditions indicative of substantially stationary conditions were valid, and the one or more conditions are no longer valid, the UE 106 may determine that it may no longer be in substantially stationary conditions. For example, if the signal strength/quality of the first cell drops below the second threshold, or if a Wi-Fi network with which the UE 106 was associated is no longer detected or is detected but at a signal strength/quality below the third threshold, the UE 106 may determine that the UE 106 is no longer in substantially stationary conditions (and may thus be in mobile conditions).

In this case, the UE 106 may resume behavior suitable for mobile conditions. For example, the UE 106 may resume performing a search for neighboring cells during every DRX cycle in which signal strength/quality are below the first threshold, or otherwise resume search behavior suitable for mobile conditions. Resuming behavior suitable for mobile conditions may improve performance of the UE 106 under mobile conditions, as the UE 106 may be more aggressive in searching for and attaching to the strongest and best possible serving cell.

Note that in some embodiments, the network (e.g., via the first cell or another cell) may provide instructions and/or parameters for determining that substantially stationary conditions exist and/or behaving under substantially stationary conditions, with which the UE 106 may configure itself to operate according to various embodiments of the method described herein. For example, in some embodiments, the configuration information might include values for the first threshold (e.g., for determining, in general, under what channel conditions to search for neighboring cells) and for the second threshold (e.g., for use in determining when the UE 106 is substantially stationary). The configuration information might similarly provide other information for use in determining when the UE 106 is substantially stationary (e.g., a Wi-Fi threshold for determining if an associated Wi-Fi network is sufficiently strong to act as an indicator of substantially stationary conditions) and/or other information for use in determining how frequently to perform searches under stationary conditions. For example, according to one set of embodiments, the configuration information may indicate to the UE 106 how frequently to perform searches for neighboring cells if the signal strength metric is less than the first threshold during the DRX cycle if the UE 106 is substantially stationary. Thus, in some embodiments, the configuration information might indicate to the UE 106 to perform searches for neighboring cells if the signal strength/quality metric is less than the first threshold during the DRX cycle with an exponentially reducing frequency if the UE 106 is substantially stationary. However, in other embodiments, the UE 106 may be configured to determine that stationary conditions exist and/or modify its behavior in stationary conditions independently of (and possibly in disregard for some instructions and/or expectations of) the network.

Thus, by utilizing the method of FIG. 4 as provided above according to various embodiments, a UE 106 may advantageously conserve battery in stationary conditions by avoiding performing procedures which may not benefit the UE 106 in stationary conditions at least some of the time, while resuming such procedures in mobile conditions in order to provide the best possible wireless service to the user.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a wireless user equipment (UE) device to conserve battery in stationary conditions, the method comprising:
    establishing a first wireless link with a first cell;
    measuring one or more signal strength and/or signal quality metrics associated with the first wireless link a plurality of times;
    determining that the one or more signal strength and/or signal quality metrics are below a first threshold, wherein the UE is configured to perform a search for neighboring cells if the one or more signal strength and/or signal quality metrics are below the first threshold;
    determining that the one or more signal strength and/or signal quality metrics have been above a second threshold for a predetermined number of times consecutively, wherein the second threshold is lower than the first threshold;
    wherein the UE does not perform a search for neighboring cells based on determining that the one or more signal strength and/or signal quality metrics have been above the second threshold for a predetermined number of times consecutively.

2. The method of claim 1, wherein establishing the first wireless link with the first cell further comprises:
    receiving instructions for periodically measuring the one or more signal strength and/or signal quality metrics, wherein the instructions configure the UE to perform the search for neighboring cells if a measurement indicates that the one or more signal strength and/or signal quality metrics are below the first threshold.

3. The method of claim 1, the method further comprising:
    reducing a frequency at which the UE is configured to perform a search for neighboring cells if a measurement indicates that the one or more signal strength and/or signal quality metrics are below the first threshold based on determining that the one or more signal strength and/or signal quality metrics have been above the second threshold for a predetermined number of times consecutively.

4. The method of claim 3, wherein the frequency at which the UE is configured to perform a search for neighboring cells if a measurement indicates that the one or more signal strength and/or signal quality metrics are below the first threshold is reduced according to an exponential drop-off schedule.

5. The method of claim 1, wherein the first wireless link with the first cell comprises a wireless link according to a first wireless technology, wherein the method further comprises:
    wirelessly associating with a wireless network according to a second wireless technology, wherein the wireless network is a substantially localized type of network;

wherein the UE does not perform a search for neighboring cells also based on wirelessly associating with the wireless network according to the second wireless technology.

6. A wireless user equipment (UE) device configured to conserve battery in stationary conditions, the UE comprising:
a radio, comprising one or more antennas and configured for performing wireless communication;
a processor;
a computer accessible memory medium comprising program instructions executable by the processor to, at a first time:
establish a first wireless link with a first cell;
measure one or more signal strength and/or signal quality metrics associated with the first wireless link;
determine that one or more of the signal strength and/or signal quality metrics are below a first threshold;
perform a search for neighboring cells based on determining that the one or more of the signal strength and/or signal quality metrics are below the first threshold;
wherein the memory medium further comprises program instructions executable by the processor to, at a second time:
determine that the UE is substantially stationary based on previous signal strength and/or signal quality measurements;
measure the one or more signal strength and/or signal quality metrics associated with the first wireless link, wherein the one or more signal strength and/or signal quality metrics are below the first threshold at the second time;
determine to not perform a search for neighboring cells at the second time, based on determining that the UE device is substantially stationary.

7. The UE of claim 6, wherein to determine that the UE is substantially stationary, the memory medium comprises program instructions executable to:
measure the one or more signal strength and/or signal quality metrics associated with the first wireless link a plurality of times;
determine that the one or more signal strength and/or signal quality metrics have been above a second threshold for a predetermined number of times consecutively.

8. The UE of claim 7, wherein the second threshold is lower than the first threshold.

9. The UE of claim 6, wherein the first wireless link with the first cell comprises a wireless link according to a first wireless technology, wherein the memory medium comprises program instructions further executable to:
determine that the UE is substantially stationary based on wirelessly associating with a wireless network according to a second wireless technology, wherein the wireless network is a substantially localized type of network.

10. The UE of claim 9, wherein the wireless network according to the second wireless technology is a wireless local area network (WLAN).

11. The UE of claim 6, wherein the memory medium comprises program instructions further executable to:
determine that the UE is substantially stationary based on currently having at least one external wired connection.

12. The UE of claim 6, the memory medium comprises program instructions further executable to:
use a global navigational satellite system to determine that the UE is substantially stationary.

13. The UE of claim 6, wherein the one or more of the signal strength and/or signal quality metrics comprise an Ec/Io measurement.

14. The UE of claim 6, wherein the search for neighboring cells comprises one or more of an intra-frequency search or an inter-frequency search.

15. A non-transitory computer accessible memory medium comprising program instructions for a UE to conserve battery in stationary conditions, wherein the program instructions are executable to:
establish a connection with a network via a first wireless link with a first cell;
receive configuration information from the network, wherein the configuration information comprises information for configuring the UE to operate in a discontinuous reception (DRX) mode;
configure the UE to operate in the DRX mode based on the configuration information;
measure a signal strength metric associated with the first wireless link in each of a plurality of DRX cycles according to the DRX mode configuration;
determine that the UE is substantially stationary based on previous signal strength measurements;
determine, during each of a plurality of DRX cycles, that the signal strength metric is below the first threshold, wherein the configuration information indicates to the UE to perform a search for neighboring cells if the signal strength metric is below the first threshold;
perform, during the plurality of DRX cycles, one or more searches for neighboring cells, wherein fewer searches for neighboring cells are performed than a number of times that the signal strength metric is determined to be below the first threshold based on determining that the UE is substantially stationary.

16. The memory medium of claim 15, wherein the program instructions are executable to perform searches for neighboring cells if the signal strength metric is below the first threshold at an exponentially reducing frequency based on determining that the UE is substantially stationary.

17. The memory medium of claim 15, wherein the program instructions are configured to determine that the UE is substantially stationary based on determining that one or more conditions are valid, wherein the one or more conditions comprise one or more of:
the signal strength metric being above a second threshold for a predetermined number of consecutive measurements; or
a wireless local area network (WLAN) associated with the UE with having a signal strength greater than a third threshold.

18. The memory medium of claim 17, wherein the configuration information indicates values of the first threshold and the second threshold.

19. The memory medium of claim 15, wherein the program instructions are configured to determine that the UE is substantially stationary based on determining that one or more conditions are valid, wherein the program instructions are configured to:
determine that the one or more conditions are not valid;
determine, during each of a plurality of subsequent DRX cycles, that the signal strength metric is below the first threshold;
perform, during each of the plurality of subsequent DRX cycles in which the signal strength metric is determined to be below the first threshold, a search for neighboring cells, based on determining that the one or more conditions are not valid.

20. The memory medium of claim 15,
wherein operating in the DRX mode comprises performing one or more actions in each of a plurality of periodic DRX cycles and remaining inactive between the periodic DRX cycles, wherein the configuration information indicates a DRX cycle period.

21. A non-transitory computer-accessible memory medium comprising program instructions for a base station to provide configuration information to a wireless user equipment (UE) device, wherein the program instructions are executable to:
by the base station:
establish a first wireless link with the UE via a first cell;
provide configuration information to the UE via the first wireless link, wherein the configuration information comprises information for configuring the UE to operate in a discontinuous reception (DRX) mode;
wherein the configuration information indicates values of a first signal strength threshold and a second signal strength threshold, wherein the first and second signal strength thresholds are configured for use by the UE in determining when to perform searches for neighboring cells;
wherein the second signal strength threshold is configured for use by the UE in determining if the UE is substantially stationary.

22. The memory medium of claim 21,
wherein the configuration information indicates to the UE to perform a search for neighboring cells during a DRX cycle if the signal strength metric is less than a first threshold during the DRX cycle and if the UE is not substantially stationary;
wherein the configuration information indicates to the UE how frequently to perform searches for neighboring cells if the signal strength metric is less than the first threshold during the DRX cycle if the UE is substantially stationary.

23. A method for a base station to provide configuration information to a wireless user equipment (UE) device, the method comprising:
by the base station:
establishing a first wireless link with the UE via a first cell;
providing configuration information to the UE via the first wireless link, wherein the configuration information comprises information for configuring the UE to operate in a discontinuous reception (DRX) mode;
wherein the configuration information indicates to the UE to measure a signal strength metric during each DRX cycle;
wherein the configuration information indicates to the UE to perform a search for neighboring cells during a DRX cycle if the signal strength metric is less than a first threshold during the DRX cycle if the UE is not substantially stationary;
wherein the configuration information comprises a second threshold configured for use by the UE in determining if the UE is substantially stationary;
wherein the configuration information indicates to the UE how frequently to perform searches for neighboring cells if the signal strength metric is less than the first threshold during the DRX cycle if the UE is substantially stationary.

24. The method of claim 23,
wherein the configuration information indicates to the UE to perform searches for neighboring cells if the signal strength metric is less than the first threshold during the DRX cycle according to an exponentially reducing frequency if the UE is substantially stationary.

* * * * *